March 31, 1959     C. W. VOGT     2,879,809
METHOD AND EQUIPMENT FOR MEASURING PREDETERMINED QUANTITIES
OF COMPACTED COMMINUTED MATERIALS OR THE LIKE
Filed Jan. 3, 1957     3 Sheets-Sheet 2
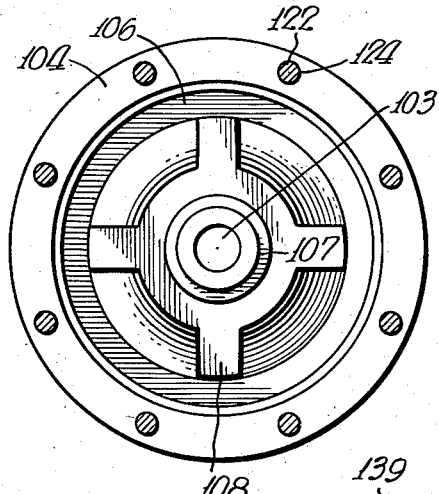
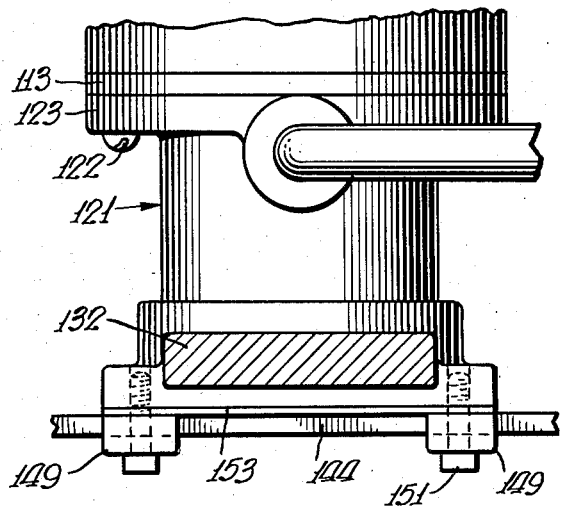
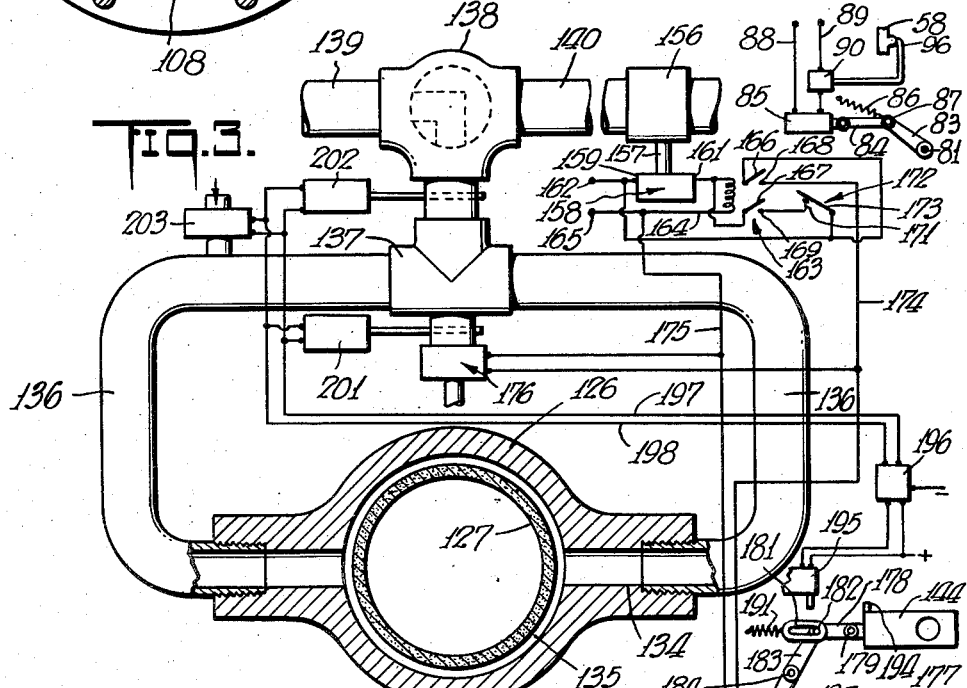
INVENTOR
Clarence W. Vogt
BY
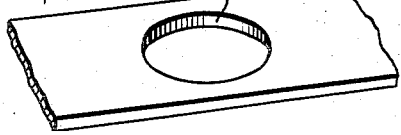
ATTORNEYS March 31, 1959  C. W. VOGT  2,879,809
METHOD AND EQUIPMENT FOR MEASURING PREDETERMINED QUANTITIES
OF COMPACTED COMMINUTED MATERIALS OR THE LIKE
Filed Jan. 3, 1957  3 Sheets-Sheet 3
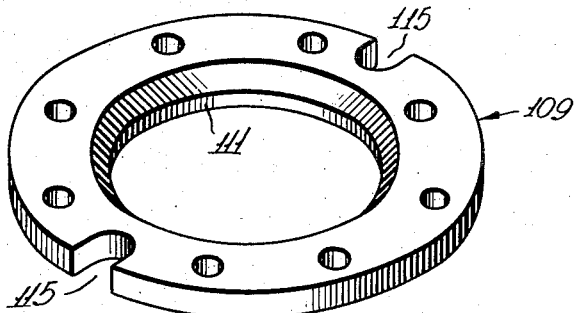
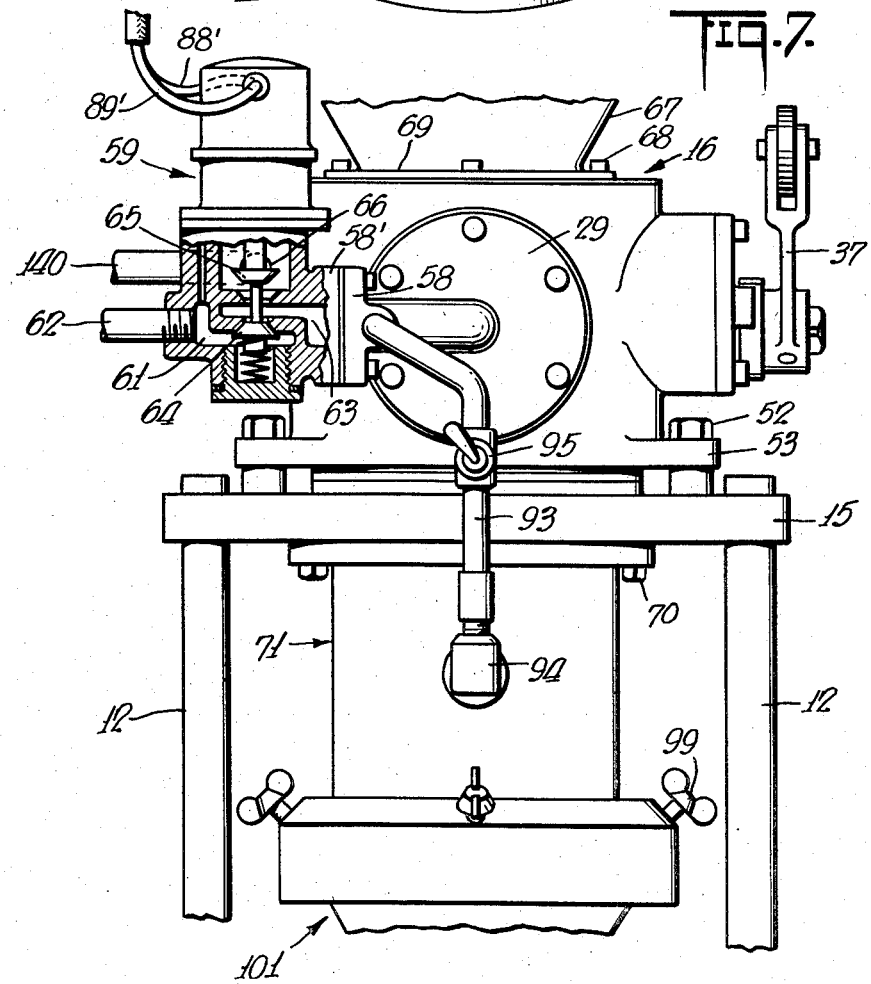
INVENTOR
Clarence W. Vogt
BY
Dean Fairbank & Hirsch
ATTORNEYS

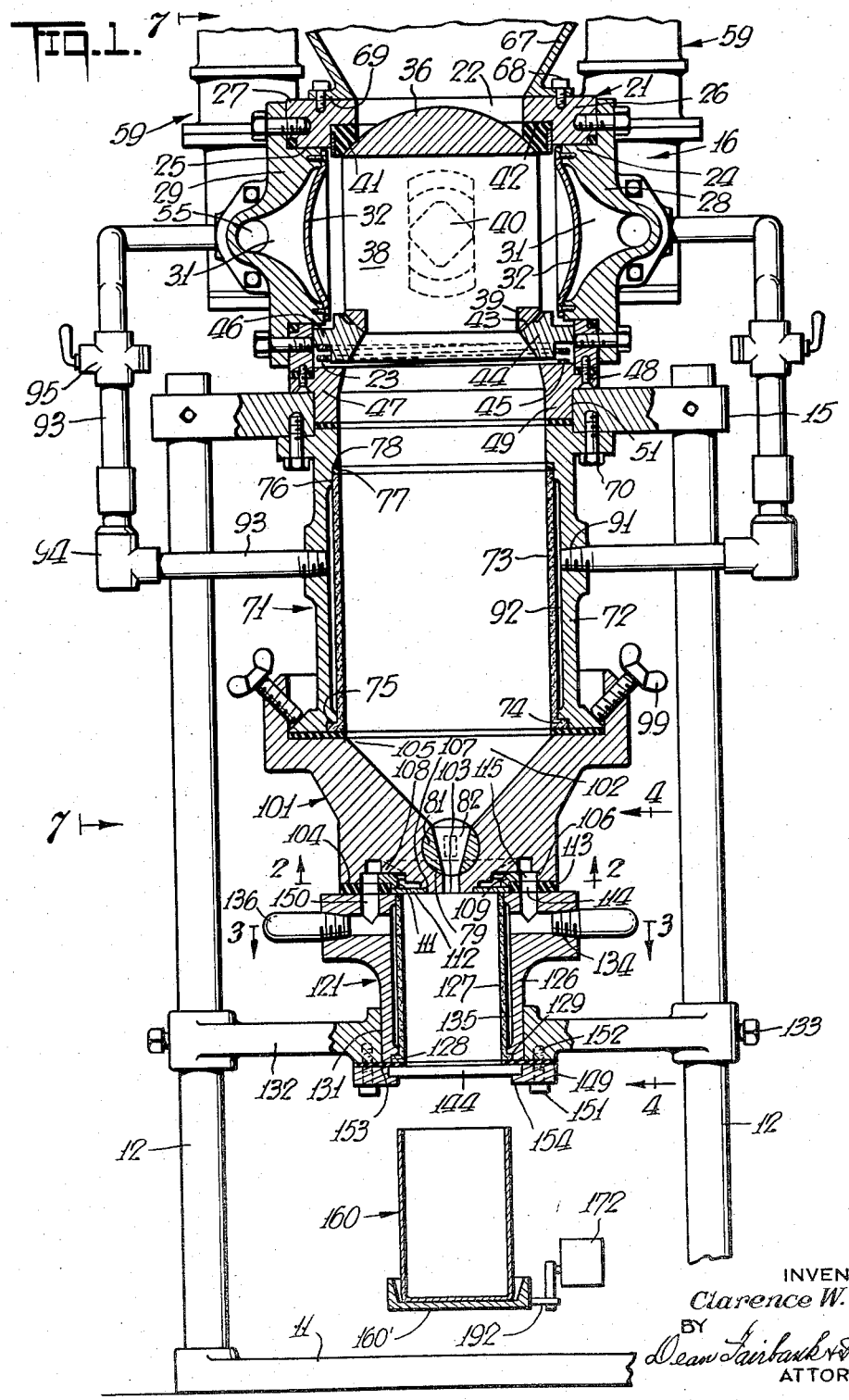

United States Patent Office 2,879,809
Patented Mar. 31, 1959

2,879,809

METHOD AND EQUIPMENT FOR MEASURING PREDETERMINED QUANTITIES OF COMPACTED COMMINUTED MATERIALS OR THE LIKE

Clarence W. Vogt, Westport, Conn.

Application January 3, 1957, Serial No. 632,358

24 Claims. (Cl. 141—12)

This invention relates to a method and equipment for compacting finely divided or comminuted particles or the like and more particularly to a receptacle into which a predetermined quantity of such material may be charged.

It is among the objects of the invention to provide an expeditious, relatively simple method to charge a receptacle with a predetermined quantity of comminuted material in compacted form and to eject such material from the receptacle without undue disturbance thereof.

Another object is to provide a receptacle that may readily be used in conjunction with a blowing head and magazine and which may readily be charged with a predetermined quantity of material and which is designed to facilitate removal of the charged material in the receptacle so that such material may be deposited in a container of any suitable sort without need for a seal between the container and the receptacle and without the need for reinforcing structure for the container.

According to the invention these objects are accomplished by the arrangement and combination of elements hereinafter described and particularly recited in the claims.

In the accompanying drawings in which is shown one or more of various possible embodiments of the several features of the invention, Fig. 1 is a front elevational view of the equipment in cross section, Fig. 2 is a transverse sectional view taken along line 2—2 of Fig. 1, showing the outlet end of the magazine nozzle, Fig. 3 is a view similar to Fig. 2 taken along line 3—3 of Fig. 1 with a portion of the control circuit of the equipment associated therewith, Fig. 4 is a fragmentary detail view taken along line 4—4 of Fig. 1, Fig. 5 is a fragmentary perspective view of the receptacle closure plate, Fig. 6 is a perspective view of the ring member of the magazine nozzle, and Fig. 7 is a fragmentary view partly in cross section taken along line 7—7 of Fig. 1.

Referring now to the drawings, the equipment desirably comprises a base plate 11 which has a pair of supports or standards 12 rising therefrom.

Extending transversely between standards 12 and slidably mounted thereon is a vertically adjustable support 15 which mounts a blowing head 16 preferably of the type shown in my co-pending application Serial No. 624,421, filed November 26, 1956.

As shown in Fig. 1 the blowing head comprises a casing 21 having an inlet 22 in its top wall and an outlet 23 in its bottom wall. Generally circular openings 24, 25 are formed in the opposed sides 26, 27 of the casing 21 over which are mounted generally disc-like cover plates 28, 29, each having a cavity 31 therein covered by a circular filter plate 32 which is concave on its inner surface, said plates preferably being of porous material such as sintered metal.

Positioned in the casing 21 is a ball valve 36 which may be rotated by a lever 37 connected to shaft 40. The ball valve 36 is provided with a diametrically extending passageway or bore 38 and an intersecting passageway or bore 39 forming a generally T-shaped cavity therein.

A sealing ring for the ball valve member 36 such as a rubber ring 41 is mounted in a recess 42 formed in the undersurface of the top wall of the casing around inlet 22. The ring 41 provides an effective seal but permits rotation of said ball valve member. The lower portion of the ball valve 36 is engaged by the curved seat 43 of a supporting ring 44 formed of metal or other rigid material. The ring 44 is slidably mounted in the outlet 23 and is normally raised upwardly by means of a spring 45 interposed between a flange 46 on the ring 44 and a retaining ring 47 detachably mounted on the bottom of the casing 21 as by screws 48.

The ring 47 has an annular extension 49 which extends into a complementary opening 51 in the support 15 and screws 52 which extend through flanges 53 at opposite sides of the casing 21 secure the latter to the support 15.

Each of the cover plates 28, 29 has a passageway 55 leading from the associated cavity 31 to a coupling 58 to which is connected the complementary coupling 58' of a solenoid valve unit 59 described more particularly in my co-pending applications Serial Nos. 594,152, filed June 27, 1956, and 611,231, filed September 21, 1956. Each of the units 59 has an inlet port 61 connected by common line 62 to a source of gas under pressure and a control port 63 connected to the associated coupling 58'. In addition each unit 59 has a normally closed valve 64 which controls flow of gas under pressure from line 62 to control port 63 and a normally open valve 65 which controls discharge of gas from the control port 63 to exhaust port 66 of the valve unit.

Mounted on the top of the casing 21 over the inlet 22 is a supply hopper 67 secured in position as by screws 68 which extend through a flange 69 at the bottom of the hopper.

The material in the hopper flows therefrom in the manner to be described, into a magazine 71 mounted beneath the outlet 23 of the blowing head and secured in position as by screws 70.

As shown in Fig. 1, the magazine 71 comprises an outer casing 72 which has a filter liner 73 therein slightly spaced from the adjacent wall of the casing. The latter may also be of porous material such as sintered metal, and illustratively is a sleeve which has an annular flange 74 at its lower end seated in an annular recess 75 in the lower end of the casing 72. The upper end 76 of the liner 73 is retained against a sealing ring 77 positioned against an annular shoulder 78 near the top of casing 72.

The casing 72 has a plurality of ports 91 leading into the space 92 between the casing 72 and the liner 73 and said ports are connected by lines 93 through one-way valves 94 and manually operated flow regulating valves 95 to an associated coupling 58.

Releasably secured to the lower end of the casing 72 as by screws 99 is a cup-shaped nozzle member 101 which has a conical cavity 102 therein forming a funnel having an outlet 103 at its lower end 104 and its mouth 105 aligned with the lower end of liner 73.

The nozzle member 101 near its lower end 104 has a transverse bore 79 through which extends a cylindrical valve member 81 having a conical bore 82 extending at right angles therethrough and adapted to be vertically aligned with the cavity 102 and outlet 103 as shown in Fig. 1.

The valve member 81 has a lever 83 affixed at one end thereto (Fig. 3), the other end of the lever being pivotally connected by means of a link 84 to the armature of a solenoid 85. The valve member is normally retained in closed position with respect to outlet 103 by means of a coil spring 86, connected at one end as at 87 to link 84 and at its other end to the frame of the machine. The solenoid is electrically connected by leads 88, 89 to the leads 88', 89' controlling the valves 59, a pressure switch 90 being electrically connected in lead 89. The pressure switch 90 is connected by line 96 to the fitting 58 so that when gas under pressure flows through said fitting 58 in the manner hereinafter described, it will also react against pressure switch 90 to actuate the latter.

The lower end 104 of the nozzle 101 has an annular groove 106 therein defining an annular shoulder 107 adjacent to and coaxial with outlet 103. Formed integral with the nozzle 101 and extending radially into the annular groove 106 are a plurality of equidistant bosses 108 against which rests the inner perphery of a ring member 109, the outer periphery of said member 109 being of diameter substantially equal to that of said groove 106 to center the ring member 109 therein.

As shown in Figs. 1 and 6, the ring member 109 has a depending annular lip 111 on its inner perphery and a filter ring 112 desirably of porous material such as sintered metal, of outer diameter substantially equal to the outer diameter of said lip 111 rests against said annular shoulder 107 and said lip 111.

Encompassing lip 111 and the outer periphery of filter ring 112 is a gasket 113 of outer diameter substantially equal to that of the lower end 104 of member 101, said washer 113 having a pair of openings 114 therethrough aligned with cutouts 115 in ring member 109.

Positioned against the basket 113 and filter ring 112 and depending therefrom is a receptacle 121 which is secured in position as by screws 122 extending through openings in an annular flange 123 at the upper end thereof and through openings in gasket 113 into threaded openings 124 in the lower end 104 of member 101.

The receptacle 121 comprises an outer casing 126 which has a filter liner 127 therein slightly spaced from the adjacent wall of casing 126. The liner is of porous material such as sintered metal and illustratively is a sleeve which has an annular flange 128 at its lower end seated in an annular recess 129 in the lower end of the casing 126.

Desirably, the porosity of the liner 127 is less per unit of surface than the porosity of ring 112 and in the illustrative embodiment, at a given gas pressure and in a given period, each unit of surface of ring 112 will pass approximately 100 times the quantity of gas that will be passed by the same unit of surface of liner 127.

The casing 126 extends through an opening 131 in a vertically adjustable support 132 mounted on standards 12 and secured in position as by screw 133.

The casing 126 has a plurality of ports 134 leading into the space 135 between the casing 126 and the liner 127 and said ports are connected by lines 136 to a T-fitting 137 which is also connected to a valve 138. The valve 138 in one position connects the ports 134 to line 139 which leads to the atmosphere or to a partial vacuum and in another position to line 140 desirably connected to the exhaust ports 66 of the solenoid valves 59.

Positioned beneath the lower end of casing 126 is a rectangular plate 144 which, as shown in Fig. 5, has an opening 145 therethrough of diameter preferably slightly larger than that of liner 127.

The plate 144 is slidably mounted by means of a plurality of guides such as blocks 149 through which screws 151 extend into threaded openings 152 in support 132, a gasket 153 intervening between the blocks 149 and the support. Each of the blocks has an inwardly extending flange 154 on which the plate 144 rests slidably to mount said plate.

The line 140 (Fig. 3) has a T-fitting 156 connected by line 157 to a pressure switch 158. The terminals 159, 161 of the pressure switch 158 are connected respectively to one side 162 of a source of potential and to one end of the coil of a relay 163, the other end of said coil being connected by lead 164 to the other side 165 of the source of potential. The relay 163 has a pair of contact arms 166, 167 normally spaced from fixed contacts 168, 169. The source of potential 162 is connected to contact arm 166 and contact arm 167 is connected to terminal 161 of the pressure switch 158. Fixed contact 169 of relay 163 is connected to fixed contact 171 of a micro-switch 172, said contact 171 being normally engaged by contact arm 173, which is connected to the source of potential 162. The fixed contact 168 of relay 163 and the source of potential 165 are connected by leads 174 and 175 to solenoid operated valve 176 and solenoid 177.

The solenoid valve 176 is connected to fitting 137 and controls venting of gas therefrom. The solenoid 177 controls the operation of slide plate 144. To this end the plate 144 has a link 178 pivotally connected thereto at one end as at 179. The other end of the link 178 has an elongated slot 181 through which extends a pin 182 carried at one end of a lever 183 pivoted as at 184. The other end of the lever 183 is pivotally connected to one end of a link 185 which is pivotally connected to the armature of solenoid 177.

The plate 144 is normally retained in closed position, i.e., with opening 145 clear of the lower end of liner 127, by means of a coil spring 191 which reacts against the link 178 as shown in Fig. 3.

The micro-switch 172 (Figs. 1 and 3) which is normally in closed position, is momentarily opened by the action of a plurality of pins 192 carried by the conveyor 160' slightly in advance of each of the containers 160 thereon.

The plate 144, as shown in Fig. 3, carries a pin 194 which, when the plate is moved to fully open position will momentarily actuate a micro-switch 195 to complete a circuit to time delay relay 196. This relay is of the type that when once actuated it will remain actuated for a given period of time even though the source of current thereto is broken.

The relay 196 is electrically connected through leads 197, 198 to solenoid operated valves 201, 202, 203. The valves 201, 202 which are normally open, are connected respectively between valve 176 and fitting 137 and between fitting 137 and valve 138. The valve 203 which is normally closed is connected between line 136 and a source of gas under a relatively low pressure.

In the operation of the unit, the ball valve 36 is rotated by lever 37 so that the diametric passageway 38 is disposed vertically to permit material to flow from the hopper 67 through the valve to charge the magazine 71 and the nozzle member 101.

After the magazine and nozzle member 101 are charged, the ball valve 36 is rotated to the position shown in Fig 1 in which the diametric passageway 38 is aligned with porous plates 32 and the radial passageway 39 is vertically aligned with the magazine 71.

Thereupon the solenoid units 59 are energized to open valves 64 and close valves 65. Consequently, gas under pressure will flow from line 62, through ports 61 of units 59, open valves 64, control ports 63 and passageways 55 through porous plates 32 to react against the material at each end of the diametric passageway 38, thereby forcing the body of material in the T-shaped cavity in the valve in a generally downward direction. The application of such source of gas under pressure against the material in the ball valve, which is above the magazine and nozzle member will cause the material therein also to tend to move in a generally downward direction. However, as valve 81 is normally closed, no material will be discharged into the receptacle. When the pressure of the gas applied to the contents of the magazine rises to a predetermined amount, the pressure switch 90 will close to complete a circuit to solenoid 85 to rotate valve 81 to open position. Thereupon by reason of the gas pressure, the material in the magazine and nozzle will be ejected through the outlet 103 into the receptacle 121 to fill such receptacle with a compacted charge of material of predetermined quantity depending upon the size of the receptacle and the gas pressure.

As the valve 81 is normally closed during the intervals between successive blowings, material cannot begin to flow into the receptacle prior to attainment of the desired compacting velocity, so that lack of compactness with resultant reduction in the quantity of the charge is avoided. In addition, by reason of the pre-pressure build up prior to opening of valve 81, clogging of certain materials such as brown sugar with its high molasses content is avoided.

By reason of the porous liner 127, gas from the receptacle will be discharged therethrough into ports 134 and gas from the receptacle will also be discharged through porous ring 112, annular groove 106, cutouts 115 in ring 109 and openings 114 in gasket 113 through passageway 150 into ports 134. From ports 134 the gas will escape through lines 136, open valve 202, valve 138 and line 139 to the atmosphere or to a partial vacuum to insure effective compacting of material in the receptacle, the porous ring 112 and porous liner 127 restraining passage of any material therethrough.

Simultaneously with the application of gas under pressure to the ends of the diametric passageway 38 in the valve 36, gas under pressure will also be applied from coupling 58 through line 93, and valves 95 and 94 into ports 91 of magazine 71. The gas entering such ports will be dispersed through the porous liner 73 to react against the side wall of the column of material in the magazine.

As a result of the lateral pressure effected by the gas entering ports 91, the column of material in the magazine will be compacted laterally, thereby preventing or at least greatly minimizing any channeling action by the gas under pressure reacting against such column of material to urge it generally downwardly for ejection through outlet 103.

In addition, by reason of the film of gas encompassing the column of material in the magazine, its downward movement will be aided for more rapid discharge through outlet 103.

By reason of the porous liner 73, the gas under pressure passing therethrough will be dispersed over a large area. Hence there will be no concentrated gas stream which might cause lateral channeling in such material and introduction of relatively large quantities of such gas into the material forced into the receptacle with resultant ineffective compaction of such material.

By reason of the flow control valves 95, the quantity of gas entering the ports 91 in a given period may be regulated with respect to the quantity of air in a given period reacting against the material through the ends of tthe diametric passageway 38. Thus the valves 95 are regulated so that the gas entering ports 91 will be sufficient to compact the material laterally to prevent vertical channeling of gas, yet not sufficient to prevent downward movement of the column of material in the magazine for discharge through outlet 103.

After the blow cycle is completed and the receptacle 121 is filled, the solenoid units 59 are de-energized to close valves 64 and open valves 65 and the circuit to solenoid 85 is also broken so that spring 86 will restore valve 81 to its closed position. At the same time the valve 138 is set in any suitable manner to connect ports 134 to line 140.

By reason of the check valves 94, no gas will flow back through line 93 and the gas in the magazine and in the valve 38 will discharge through open valves 65 and exhaust ports 66, the upward movement of such gas agitating the material in the magazine to prevent lumping thereof.

The gas under pressure released through exhaust ports 66 will pass through line 140, valve 138 and open valve 202 into ports 134 of receptacle 121 and thence through liner 127 to react against the side of the column of material in the receptacle and through annular groove 106 and through porous ring 112 to react against the top of the column of material in the receptacle.

As a result of the flow of gas under pressure through the porous liner 127 and ring 112 from exhaust port 66, which is now of a pressure less than that originally applied through line 62, the column of material in the receptacle will be further compacted but this will not affect the quantity of material in the receptacle. Such additional compacting will substantially eliminate the adhesion of the material to the liner 127, and ring 112 and also clean the inner surfaces of said liner and said ring of any particles adhering thereto.

As the exhaust gas flows through line 140 it will also pass through fitting 156 and line 157 to react against the pressure switch 158. When the pressure has built up to a predetermined value, the pressure switch 158 will be actuated to complete a circuit from power sources 162, 165 to the coil of relay 163 to energize said relay.

As a result, the contact arms 166, 167 thereof will engage fixed contacts 168, 169 respectively. Closing of contacts 167, 169 will provide a holding circuit for relay 163 through normally closed micro-switch 172. Closing of contacts 166, 167 will complete a circuit from the source of potential to the solenoid valve 176 and the solenoid 177.

When solenoid valve 176 is energized it will open to permit discharge of the gas under pressure from lines 136 and 140 to effect reduction of the pressure on the material in the magazine 71 and the receptacle 121. Although pressure switch 158 will again open, by reason of the associated holding circuit, the relay 163 will remain energized.

Although solenoid 177 is energized at the same time as solenoid valve 176, by reason of the lost motion slot 181, the plate 144 will not be moved to align opening 145 therein with the end of liner 127 until the pressure in receptacle 121 has dropped to atmosphere pressure or any greater pressure if so desired.

When plate 144 has moved to open position, the pin 194 will actuate micro-switch 195 to energize time delay relay 196. As a result, valves 201, 202 and 203 will be actuated. Closing of valves 201, 202 will prevent escape of gas from line 136 through open valve 170 and through valve 138 and line 140 to exhaust ports 66. Opening of valve 203 will connect line 136 to a source of low pressure gas which will be applied through liner 127 and ring 112 to react against the compacted contents of the receptacle.

As the ring 112 permits approximately 100 times the quantity of gas to pass through each unit of surface thereof than that which will pass through liner 127, the downward pressure will effect ejection of the column of material in the liner 127 without the lateral pressure through liner 127 preventing such ejection, such lateral pressure in fact providing a film of gas encompassing such column which enhances the rate of discharge thereof.

The ejected column of material will fall in compacted form into a suitable container 160 positioned on conveyor 160' beneath plate 144, a plurality of such containers being carried by said conveyor.

After sufficient period of time to permit ejection of the contents of the receptacle, say a fraction of a second, time delay relay 196 will become de-energized, ready for the next cycle.

After the container 160 is filled, through suitable means, the conveyor 160' will be advanced to position the next container beneath the plate 144 aligned with the lower end of liner 127.

As the conveyor advances, the pin 192 carried thereby will actuate the micro-switch 172 to break the holding circuit for relay 163. As a result contacts 166, 167 and 168, 169 will open to break the circuit to the solenoid valve 176 and solenoid 177. Consequently, valve 176 will close and the spring 191 will restore the plate to closed position, ready for the next filling cycle.

With the equipment above described, highly effective compacting of a predetermined quantity of material may be secured in the receptacle, of the material contained in the magazine and the material in the receptacle may be readily ejected therefrom into any suitable container without need for seals between the container and the nozzle member.

If desired, a chute of desired configuration such as oval or square in cross section may be positioned beneath the receptacle so that the column of material ejected from the receptacle may be formed into the desired shape.

As many changes could be made in the above construction and method and many apparently widely different embodiments of this invention could be made without departing from the scope of the claims, it is intended that all matter contained in the above description, or shown in the accompanying drawings, shall be interpreted as illustrative and not in a limiting sense.

Having thus described my invention what I claim as new and desire to secure by Letters Patent of the United States is:

1. A receptacle for comminuted material, said receptacle having a casing with an inlet and an outlet, means for opening and closing said inlet and said outlet, a filter member in said casing adjacent the side wall thereof, means to apply a source of gas under pressure through said filter member to apply lateral pressure against the contents of said receptacle, and means to apply a source of gas under pressure against the top of the contents of said receptacle to force such contents in a downward direction therefrom through said outlet.

2. A receptacle for comminuted material, said receptacle having a casing with an inlet and an outlet, means for opening and closing said inlet and said outlet, a filter member in said casing adjacent the side wall thereof, means to apply a source of gas under pressure through said filter member to apply lateral pressure against the contents of said receptacle, a filter member extending transversely across said inlet and means to apply a source of gas under pressure through said second filter member against the contents of said receptacle to force such contents in a generally downward direction therefrom through said outlet.

3. The combination set forth in claim 2 in which the means for opening and closing said outlet comprises a plate slidably mounted beneath said outlet to close the latter, said plate having an opening movable into alignment with the outlet for discharge of material therethrough.

4. The combination set forth in claim 2 in which the casing of said receptacle has a port to which a source of gas under pressure is connected and the means to apply gas under pressure through said filter members are connected to said port.

5. Equipment of the character described comprising a nozzle member having an outlet end having an annular groove, a filter ring in said annular groove, a receptacle for comminuted material adapted to be secured to the outlet end of said nozzle, said receptacle having a casing with an outlet and an inlet axially aligned with the outlet of said nozzle, means for opening and closing said inlet and said outlet, said filter ring extending over said inlet to provide communication between the interior of said casing and said annular groove, a filter member in said casing adjacent the side wall thereof and means to apply a source of gas under pressure through said filter member to apply lateral pressure against the contents of said receptacle and through said annular groove and said filter ring to apply vertical pressure against the contents of said receptacle to force such contents in a generally downward direction.

6. The combination set forth in claim 5 in which the porosity of the filter ring is greater than the porosity of the filter member.

7. The combination set forth in claim 5 in which the porosity of the filter ring is such that each unit of surface thereof will pass approximately 100 times the quantity of gas that will be passed by the same unit of surface of the filter member.

8. The combination set forth in claim 5 in which a valve is provided in said nozzle member controlling said outlet.

9. The combination set forth in claim 5 in which said annular groove has a ring member therein, said filter ring is seated at its outer periphery against said ring member and a gasket encompassing said filter ring is interposed between the outlet end of said nozzle and the adjacent end of said receptacle casing.

10. The combination set forth in claim 9 in which said casing has a passageway therethrough to apply gas under pressure through said filter member and a passageway extends through the end thereof adjacent the nozzle, said gasket and said ring member having aligned openings to provide communication between said last named passageway and said annular groove.

11. Equipment of the character described, comprising a casing having an inlet and an outlet, a ball valve in said casing having a passageway diametrically therethrough and a passageway intersecting said diametric passageway, means to rotate said ball to a first position such that the diametric passageway provides communication between said inlet and said outlet and to a second position such that the intersecting passageway is in communication with said outlet and the inlet is cut off, a magazine having a casing in communication with the outlet of said ball valve casing and an outlet, a filter member in said magazine casing adjacent the wall thereof, means to apply a source of gas under pressure through said filter member to apply lateral pressure against the contents of said magazine, means to apply a source of gas under pressure against the ends of said diametric passageway to force the contents of the magazine in a generally downward direction therefrom through the outlet thereof, a nozzle member affixed at its mouth to the outlet of said magazine, said nozzle member having an outlet end, a receptacle for comminuted material adapted to be secured to the outlet end of said nozzle, said receptacle having a casing with an inlet axially aligned with the outlet of said nozzle and having an outlet, means for opening and closing said receptacle outlet, a filter member in said casing adjacent the side wall thereof, means to apply a source of gas under pressure through said filter member to apply lateral pressure against the contents of said receptacle and means to apply a source of gas under pressure against the top of the contents of said receptacle to force such contents in a downward direction therefrom through said outlet.

12. The combination set forth in claim 11 in which a valve unit is provided having an inlet port adapted to be connected to a source of gas under pressure, a control port in communication with the interior of said valve casing and an exhaust port, said valve unit having a normally closed valve between said inlet port and said control port and a normally opened valve between said control port and said exhaust port, said valves being ganged to operate in unison, said means to apply a source of gas under pressure through said receptacle filter member and against the top of the contents of the receptacle including a line connected to said exhaust port.

13. The combination set forth in claim 11 in which a valve is provided in said nozzle member controlling the outlet thereof and means to actuate said valve when the gas pressure in said magazine has attained a predetermined value.

14. The combination set forth in claim 11 in which a filter member extends transversely across the inlet to said receptacle, said receptacle casing having a port providing communication to said receptacle filter members, a valve unit having an inlet port adapted to be connected to a source of gas under pressure, a control port in communication with the interior of said valve casing and an exhaust port, said valve unit having a normally closed valve between said inlet port and said control port and a normally open valve between said control port and said exhaust port, said means to apply a source of gas under pressure through said receptacle filter members includes a line connected to said exhaust port, said line having a valve therein adapted to connect said receptacle casing port to atmosphere and cut off communication from said exhaust port to said casing port.

15. The combination set forth in claim 14 in which a normally closed solenoid valve is connected in said line between said first valve and the receptacle casing port and a pressure switch is connected to said line and electrically connected to said solenoid valve to actuate the latter when the pressure in said line has attained a predetermined value.

16. The combination set forth in claim 14 in which a plate is slidably mounted beneath said receptacle outlet, said plate having an opening movable into alignment with said outlet for discharge of material therethrough, means normally to retain the plate in closed position with respect to the receptacle outlet, a solenoid operatively connected to said plate to effect movement thereof to open position, a normally closed solenoid valve connected in said line between said first valve and the receptacle casing port to bleed gas from said line, a pressure switch connected to said line and electrically connected to said solenoid valve and to said solenoid to actuate the valve when the pressure in said line has attained a predetermined value and to actuate the soleoid to move the plate to open position and means to prevent movement of said plate until the pressure in said line has fallen to a predetermined value.

17. The combination set forth in claim 14 in which a plate is slidably mounted beneath said receptacle outlet, said plate having an opening movable into alignment with said outlet for discharge of material therethrough, means normally to retain the plate in closed position with respect to the receptacle outlet, a solenoid operatively connected to said plate to effect movement thereof to open position, a normally closed solenoid valve connected in said line between said first valve and the receptacle casing port to bleed gas from said line, a pressure switch connected to said line and electrically connected to said solenoid valve and to said solenoid to actuate the valve when the pressure in said line has attained a predetermined value and to actuate the solenoid to move the plate to open position, means to prevent movement of said plate until the pressure in said line has fallen to a predetermined value, a second normally closed solenoid valve connected to said receptacle casing port, said valve being adapted to be connected to a source of gas under pressure, a normally open solenoid valve connected between said first normally closed solenoid valve and said first valve, and means controlled by the movement of said plate to open position, to actuate said normally open solenoid valve and said second normally closed solenoid valve to cut off flow of gas through said first normally closed solenoid valve and permit flow of gas through said second normally closed solenoid valve.

18. The method of preparing predetermined quantities of comminuted material which comprises blowing comminuted material with gas under pressure into a receptacle of predetermined size, simultaneously venting gas from said receptacle and retaining the material therein to charge such receptacle with said material in compacted form, interrupting flow of further material into the receptacle, and applying gas under pressure to the material in the receptacle to eject such material therefrom.

19. The method set forth in claim 24 in which the gas under pressure applied to the receptacle is directed against the top of the column of material therein as well as to the side of such column.

20. The method set forth in claim 19 in which after blowing with the gas under pressure is discontinued, residual gas remaining in the magazine is utilized as the source of the gas under pressure applied against the outer surface of the charge of material in the receptacle.

21. The method recited in claim 24 in which the material in the magazine is restrained from entry into the receptacle until the gas pressure for blowing the material into the receptacle has attained a predetermined value.

22. The method recited in claim 24 in which the pressure of the gas applied to the receptacle is progressively decreased after its initial application and the receptacle is retained closed until the pressure of the gas thereto has fallen to a predetermined value.

23. A method of filling a container with a comminuted product comprising applying gas pressure to a comminuted product to expel a portion of the product from one chamber into another chamber, venting a gas from said another chamber while retaining the product therein, compacting the comminuted material in said another chamber and thereafter discharging it in compacted form from said another chamber into a container.

24. A method of filling a container with a predetermined quantity of comminuted material, which comprises blowing comminuted material with gas under pressure from a magazine into a receptacle of predetermined size having a closed discharge opening while venting gas from said receptacle and retaining the material therein to charge such receptacle with a predetermined quantity of material in compacted form, discontinuing blowing of such comminuted material with gas into such receptacle and thereupon applying gas under pressure against at least a portion of the outer surface of the charge of material in the receptacle substantially to eliminate the adhesion of such material to interior surfaces of such receptacle and subsequently opening such discharge opening of the receptacle for ejection of the contents thereof.

References Cited in the file of this patent

UNITED STATES PATENTS

| | | |
|---|---|---|
| 1,971,852 | Goebels | Aug. 28, 1934 |
| 2,105,778 | Behr et al. | Jan. 18, 1938 |
| 2,138,356 | Ryan et al. | Nov. 29, 1938 |
| 2,224,452 | Witte et al. | Dec. 10, 1940 |
| 2,359,029 | Goldberg | Sept. 26, 1944 |
| 2,642,215 | Carter | June 16, 1953 |